US012729750B2

(12) United States Patent
Jochman

(10) Patent No.: US 12,729,750 B2
(45) **Date of Patent: *Sep. 8, 2026**

(54) LOW NOISE POWER SYSTEMS AND ASSOCIATED METHODS

(71) Applicant: Illinois Tool Works Inc., Glenview, IL (US)

(72) Inventor: Nathan Joe Jochman, Menasha, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/807,589

(22) Filed: Aug. 16, 2024

(65) Prior Publication Data

US 2025/0052302 A1 Feb. 13, 2025

Related U.S. Application Data

(63) Continuation of application No. 17/385,174, filed on Jul. 26, 2021, now Pat. No. 12,092,213.

(60) Provisional application No. 63/062,149, filed on Aug. 6, 2020.

(51) Int. Cl.
*F16H 7/12* (2006.01)
*F02B 67/06* (2006.01)

(52) U.S. Cl.
CPC ........... *F16H 7/1281* (2013.01); *F02B 67/06* (2013.01); *F02B 2275/06* (2013.01)

(58) Field of Classification Search
CPC ...... F02B 67/06; F02B 2275/06; F02B 63/04; F02B 77/13
See application file for complete search history.

(56) References Cited

U.S. PATENT DOCUMENTS 12,092,213 B2 * 9/2024 Jochman ................. F02B 67/06
2005/0263127 A1 * 12/2005 Pigott ..................... F02B 67/06 123/198 C
2008/0264919 A1 * 10/2008 Helf ........................ F04C 18/16 417/313
2008/0264921 A1 * 10/2008 Kropp ..................... F02B 63/06 219/133
2008/0264922 A1 10/2008 Fosbinder
2009/0255741 A1 * 10/2009 Major ...................... B60K 6/48 474/84
2010/0012636 A1 1/2010 Jochman
2010/0072757 A1 3/2010 Kealy
(Continued)

OTHER PUBLICATIONS

Canadian office action dated Sep. 12, 2024 in Canadian application No. 3,126,852 (4 pages).

*Primary Examiner* — J. T. Newton

(74) *Attorney, Agent, or Firm* — McAndrews, Held & Malloy, Ltd.

(57) ABSTRACT

Power systems having reduced operating noise and associated methods are disclosed. An example power system includes an engine, a generator, a driveshaft, and a pulley system. The driveshaft may include at least one coupler configured to dampen vibration transferred by the driveshaft. The pulley system may include a first pulley and a second pulley that are drivingly coupled to one another via one or more belts. The generator may be configured to generate electric power using a rotational force received form the engine via the driveshaft and pulley system.

20 Claims, 7 Drawing Sheets

(56) References Cited

U.S. PATENT DOCUMENTS

| | | | | |
|---|---|---|---|---|
| 2012/0055719 | A1* | 3/2012 | Potter | F02B 67/06 180/53.7 |
| 2012/0058850 | A1* | 3/2012 | Potter | F02B 67/06 474/150 |
| 2012/0240900 | A1 | 9/2012 | Laitala | |
| 2014/0028029 | A1 | 1/2014 | Jochman | |
| 2014/0231400 | A1 | 8/2014 | Bankstahl | |
| 2017/0314451 | A1 | 11/2017 | Jochman | |
| 2019/0061036 | A1 | 2/2019 | Nelson | |

* cited by examiner 114
208
208
212
212
160
206
210

114
208
206
160
212
212
210

LOW NOISE POWER SYSTEMS AND ASSOCIATED METHODS

RELATED APPLICATIONS

The present application claims priority to U.S. Non-Provisional patent application Ser. No. 17/385,174, filed Jul. 26, 2021, entitled "Low Noise Power Systems and Associated Methods", and U.S. Provisional Patent Application No. 63/062,149, filed Aug. 6, 2020, and entitled "Low Noise Power Systems and Associated Methods" which is hereby incorporated by reference in its entirety.

FIELD

The present disclosure is directed to engine-driven power systems and, more particularly, to power systems with low noise, and associated methods.

BACKGROUND

Conventionally, engine-driven power systems (e.g., generators/air compressors/welders) are contained within a metal enclosure that provides environmental protection for the equipment and provides a safety, sound, and aesthetic barrier for the operators. While existing metal enclosures afford a reduction in operating noise, it is desirable to further reduce operating noise in engine-driven power systems.

SUMMARY

Power systems configured to operate at a non-synchronous speed and/or be isolated from the rest of the power unit are disclosed, substantially as illustrated by and described in connection with at least one of the figures.

According to a first aspect, a power system comprises: a driveshaft having at least one coupler configured to dampen vibration transferred by the driveshaft; an engine configured to output, to the driveshaft, a rotational force; a pulley system having a first pulley and a second pulley that are drivingly coupled to one another via one or more belts, wherein the driveshaft is coupled to the first pulley and configured to drive the first pulley, and wherein the first pulley is configured to drive the second pulley via the one or more belts; and a generator configured to generate electric power, wherein the generator is coupled to the second pulley and configured to receive the rotational force.

In certain aspects, the at least one coupler comprises a viscoelastic materials.

In certain aspects, the at least one coupler comprises a vibration-dampening polymer.

In certain aspects, the at least one coupler comprises rubber.

In certain aspects, the at least one coupler comprises a synthetic polymer.

In certain aspects, the at least one coupler comprises a first rubber coupler configured to couple the driveshaft to the engine and a second rubber coupler configured to couple the driveshaft to the pulley system.

In certain aspects, the first pulley and the second pulley are drivingly coupled to one another via one or more intermediate pulleys.

In certain aspects, the engine is mounted to a base structure via one or more isolator mounts to dampen vibration transfer from the engine to the base structure.

In certain aspects, the generator is mounted to a first base structure and the engine is mounted to a second base structure that is arranged to dampen vibration transfer to the first base structure.

In certain aspects, the engine is mounted to the second base structure via one or more isolator mounts to dampen vibration transfer from the engine to the second base structure.

In certain aspects, the power system further comprises a welding-type power supply.

In certain aspects, the power system further comprises an air compressor and a hydraulic pump.

According to a second aspect, a method for operating a power system comprises: outputting, via an engine, a rotational force to a driveshaft, wherein the driveshaft comprises at least one coupler configured to dampen vibration transferred by the driveshaft; receiving the rotational force at a first pulley of a pulley system; transferring, via one or more belts, the rotational force from the first pulley to a second pulley of the pulley system, wherein the first pulley and a second pulley that are drivingly coupled to one another at a fixed pulley ratio; receiving, at a generator, the rotational force from the second pulley; and generating, via the generator, electric power.

In certain aspects, the method further comprises the step of receiving, at a welding-type power supply, electric power from the generator.

In certain aspects, the method further comprises the steps of: mounting the generator to a first base structure; and mounting the engine to a second base structure that is arranged to dampen vibration transfer to the first base structure.

In certain aspects, the method further comprises the step of: mounting the engine to a base structure via one or more isolator mounts to dampen vibration transfer from the engine to the base structure.

In certain aspects, the at least one coupler comprises a first rubber coupler and a rubber second coupler, wherein the engine is coupled to the driveshaft via the first rubber coupler and the pulley system is coupled to the driveshaft via the second rubber coupler.

According to a third aspect, a power system comprises: a driveshaft having at least one coupler configured to dampen vibration transferred by the driveshaft; an engine configured to output, to the driveshaft, a rotational force; a pulley system having a first pulley and a second pulley that are drivingly coupled to one another via one or more belts, wherein the driveshaft is coupled to the first pulley and configured to drive the first pulley via the at least one coupler; a generator configured to generate electric power, wherein the generator is coupled to the second pulley and configured to receive the rotational force; and a welding-type power supply coupled to the generator and configured to output a welding current.

In certain aspects, the generator and the welding-type power supply are mounted to a first base structure and the engine is mounted to a second base structure that is arranged to dampen vibration transfer to the first base structure.

In certain aspects, the at least one coupler comprises rubber.

In certain aspects, the at least one coupler comprises a synthetic polymer.

BRIEF DESCRIPTION OF THE DRAWINGS

The foregoing and other objects, features, and advantages of the devices, systems, and methods described herein will be apparent from the following description of particular embodiments thereof, as illustrated in the accompanying figures; where like or similar reference numbers refer to like or similar structures. The figures are not necessarily to scale, emphasis instead being placed upon illustrating the principles of the devices, systems, and methods described herein.

DETAILED DESCRIPTION

Figure 1A:
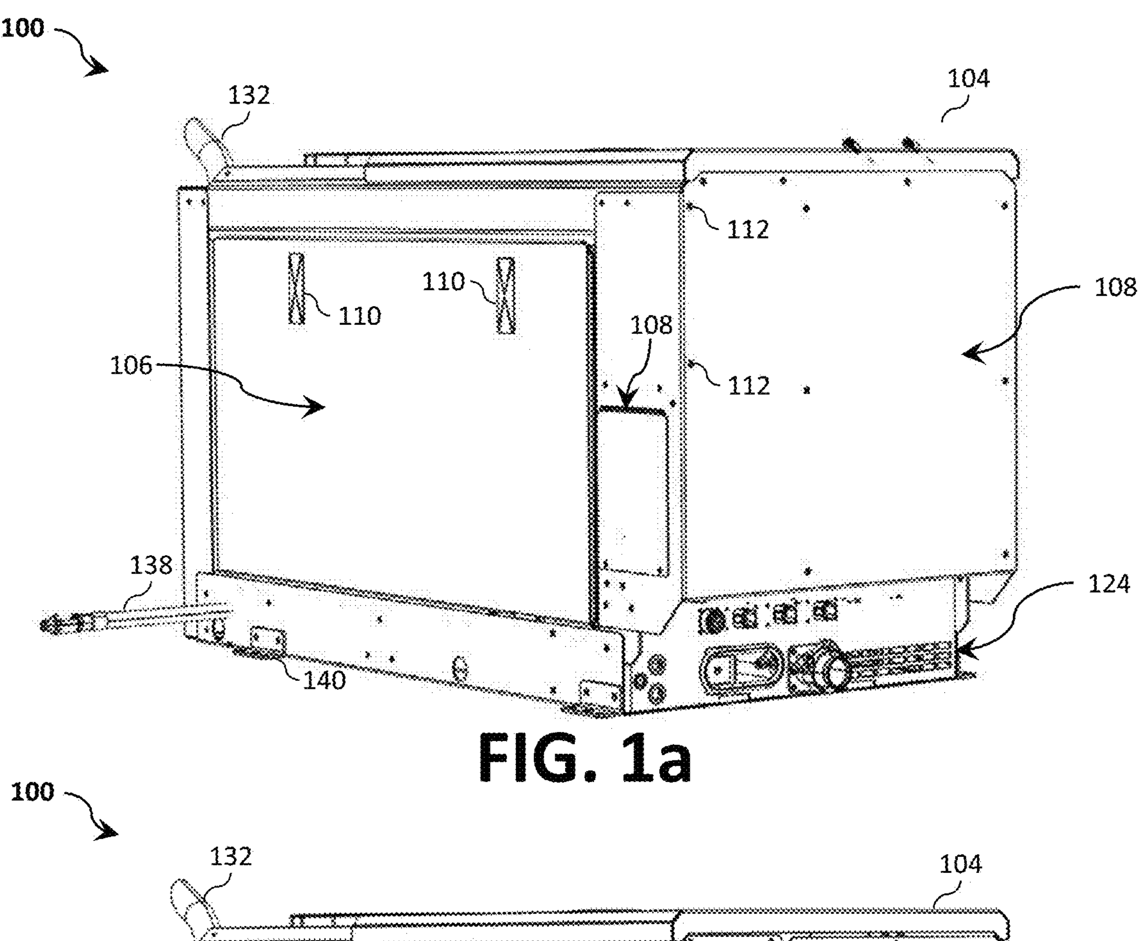
FIG. 1*a* illustrates a perspective view of an example power system having a power unit arranged within an enclosure.

References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context. Recitation of ranges of values herein are not intended to be limiting, referring instead individually to any and all values falling within the range, unless otherwise indicated herein, and each separate value within such a range is incorporated into the specification as if it were individually recited herein. In the following description, it is understood that terms such as "first," "second," "top," "bottom," "side," "front," "back," and the like are words of convenience and are not to be construed as limiting terms. For example, while in some examples a first side is located adjacent or near a second side, the terms "first side" and "second side" do not imply any specific order in which the sides are ordered.

As used herein, the terms "about," "approximately," "substantially," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments. The terms "e.g.," and "for example" set off lists of one or more non-limiting examples, instances, or illustrations. No language in the specification should be construed as indicating any unclaimed element as essential to the practice of the embodiments.

As used herein, the term "and/or" means any one or more of the items in the list joined by "and/or." As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y, and/or z" means "one or more of x, y, and z."

As used herein, the terms "drivingly coupled," "drivingly coupled to," and "drivingly coupled with" as used herein, each mean a mechanical connection that enables a driving part, device, apparatus, or component to transfer a mechanical force to a driven part, device, apparatus, or component.

As used herein, circuitry or a device is "operable" to perform a function whenever the circuitry or device comprises the necessary hardware and code (if any is necessary) to perform the function, regardless of whether performance of the function is disabled, or not enabled (e.g., by a user-configurable setting, factory trim, etc.).

As used herein, "power conversion circuitry" refers to circuitry and/or electrical components that convert electrical power from one or more first forms (e.g., power output by a generator) to one or more second forms having any combination of voltage, current, frequency, and/or response characteristics. The power conversion circuitry may include safety circuitry, output selection circuitry, measurement and/or control circuitry, and/or any other circuits to provide appropriate features.

As used herein, the term "processor" means processing devices, apparatuses, programs, circuits, components, systems, and subsystems, whether implemented in hardware, tangibly embodied software, or both, and whether or not it is programmable. The term "processor" as used herein includes, but is not limited to, one or more computing devices, hardwired circuits, signal-modifying devices and systems, devices and machines for controlling systems, central processing units, programmable devices and systems, field-programmable gate arrays, application-specific integrated circuits, systems on a chip, systems comprising discrete elements and/or circuits, state machines, virtual machines, data processors, processing facilities, and combinations of any of the foregoing. The processor may be, for example, any type of general purpose microprocessor or microcontroller, a digital signal processing (DSP) processor, an application-specific integrated circuit (ASIC). The processor may be coupled to, or integrated with a memory device. The memory device can be any suitable type of computer memory or any other type of electronic storage medium, such as, for example, read-only memory (ROM), random access memory (RAM), cache memory, compact disc read-only memory (CDROM), electro-optical memory, magneto-optical memory, programmable read-only memory (PROM), erasable programmable read-only memory (EPROM), electrically-erasable programmable read-only memory (EEPROM), a computer-readable medium, or the like.

The present disclosure is directed to a power system with a reduced operating noise and associated methods. Power systems, such as engine-driven units and other equipment, are sometimes permanently mounted to a work truck body in one or more mounting locations. Example power systems that have enclosures include engine-driven generators, welders, air compressors, and combinations thereof (e.g., a multi-use engine driven power units, such as the EnPak® power system available from Miller Electric Mfg. LLC). The mounting locations of a work truck body typically include, for example, the side on top of the tool box, the load space behind the cab (e.g., in-between the toolboxes), and/or under the deck of the body (e.g., in front of the rear axle).

Figure 1B:
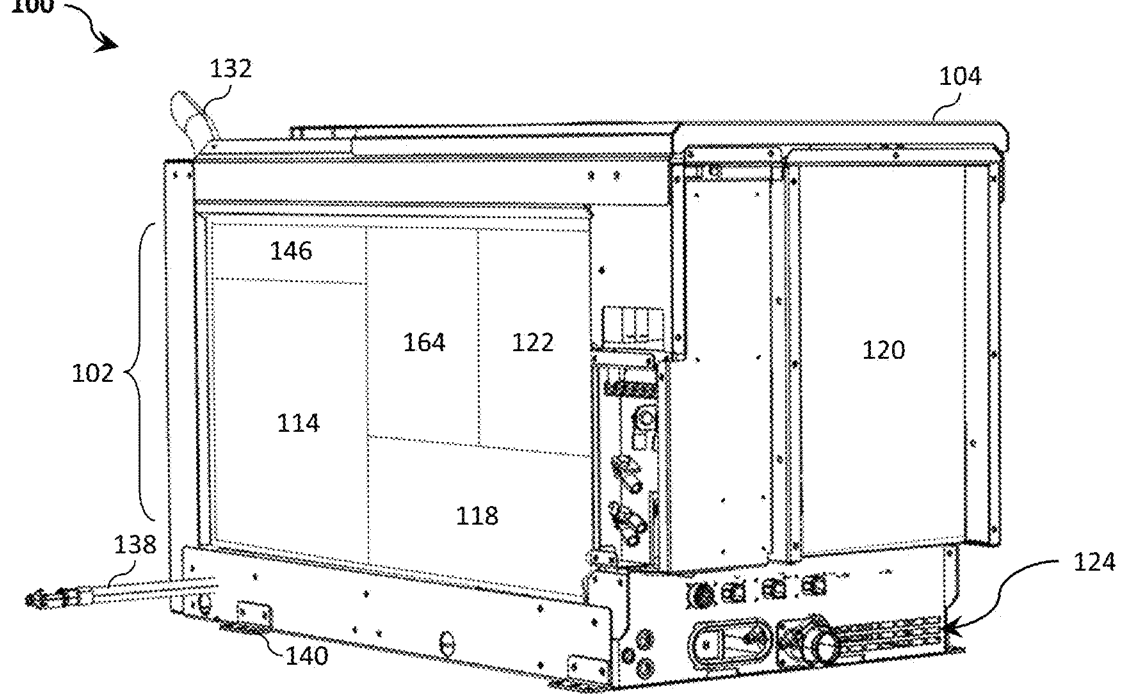
FIG. 1*b* illustrates a perspective view of the example power system with portions of the enclosure removed to better illustrate the power unit.

Examples disclosed herein provide a power system with reduced operating noise. FIGS. 1*a* and 1*b* illustrate perspective views of an example power system 100 with reduced operating noise. Specifically, FIG. 1*a* illustrates the example power system 100 with its enclosure 104 assembled, while FIG. 1*b* illustrates the example power system 100 with selected panels of the enclosure 104 removed. The example power system 100 includes a power unit 102 arranged within an enclosure 104. The enclosure 104 is primarily constructed with sheet metal, and may include multiple panels.

Service access to the power unit 102 can be provided by a removable panel (e.g., by fasteners), a door (e.g., via a hinged panel), a void in the enclosure, or by any other suitable method or design. Therefore, one or more of the panels or portions of the enclosure 104 may be removable and/or otherwise open to permit service access to the power unit 102. For example, a primary removable access panel 106 may be secured to a lateral side of the enclosure 104 via one or more latches 110 that can span the entire length of the enclosure 104 to facilitate convenient, single-side service access to the components of the power unit 102 located within interior of the enclosure 104. In some examples, the removable access panel 106 may be hingedly coupled to the enclosure 104.

In addition to the removable access panel 106, one or more secondary removable access panels 108 may be secured to the enclosure 104 via using mechanical fasteners 112, such as screws, bolts, clips, snaps, etc. In either case, as best illustrated in FIG. 1*b*, the primary and secondary removable access panels 106, 108 may be provided at the top side, bottom side, first lateral side, second lateral side, rear side, and/or front side of the enclosure 104 to facilitate access to and maintenance of the power unit 102 or portions thereof. Relative terms (e.g., front/rear, etc.) are used to aid in the reader's understanding of the enclosure's configuration. Although relative terms are used to describe the various surfaces and sides of the enclosure 104, any side can be considered a top/bottom/front/rear/first side/second side, depending on a particular design of the power system 100, the installation configuration, and/or perspective of the viewer.

The enclosure 104 (e.g., its one or more primary and secondary removable access panels 106, 108) may be cut, punched, or otherwise shaped at one or more locations to define various openings to facilitate fluid communication (e.g., air flow) between the interior and exterior of the enclosure 104 to serve as air inlet locations 124 and air outlet locations to allow cooling air in and out of the enclosure 104. The openings may be provided with or as slats, slots, holes, louvers, etc.

Figure 1C:
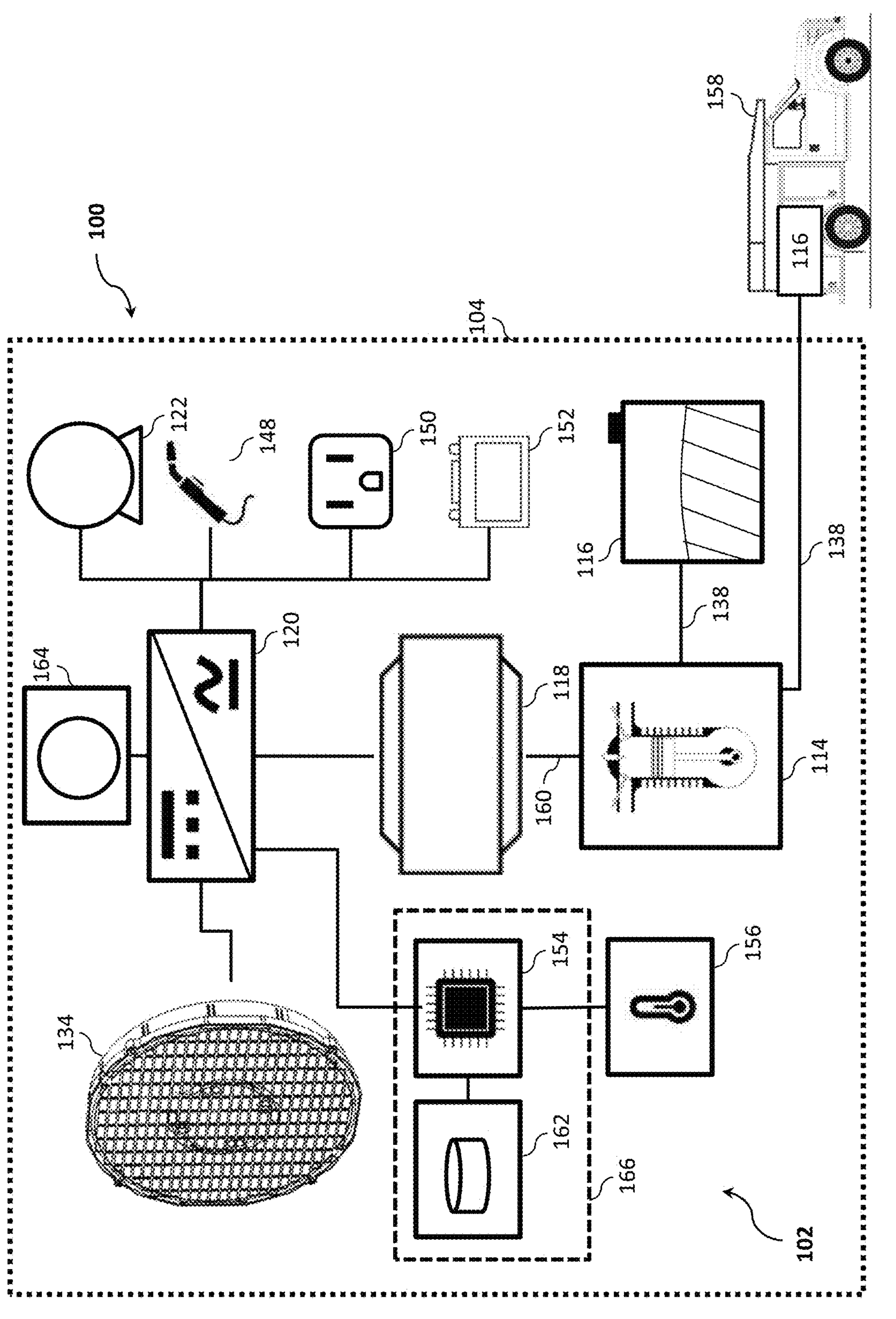
FIG. 1*c* illustrates a schematic diagram of the example power system.

The arrangements of the power unit 102 can be more easily understood from FIG. 1*c*, which illustrates the components of an engine-driven power system. As illustrated, the power system 100 includes an engine 114 and a generator 118, where the engine 114 is configured to drive a generator 118 to generate electrical power. Specifically, FIG. 1*c* illustrates a schematic diagram of the power system 100. As illustrated, the example power system 100 may comprise the engine 114, one or more fuel tanks 116, a generator 118, power conversion circuitry 120, an air compressor 122 configured to output pneumatic power, a welding-type power supply 148 configured to output welding-type power (e.g., an inverter-based welder), one or more power outlets 150, a battery charger 152, one or more fan assemblies 134, a processor 154, a memory device 162, one or more sensors 156, and/or a hydraulic pump 164 configured to output hydraulic power. The example hydraulic pump 164 and the air compressor 122 may be powered by mechanical power from the engine 114 and/or by electrical power from the generator 118. The example power system 100 may further or alternatively include other components not specifically discussed herein.

The engine 114 receives fuel from one of the one or more fuel tanks 116 via one or more fuel lines 138. The engine 114 may be a diesel or gasoline engine configured to output, for example, between 20 and 50 horse power. In one example, the engine 114 may be a small inline diesel engine. The engine 114 is controllable to operate at multiple speeds, such as an idle (e.g., no or minimal load speed) and a maximum speed (e.g., the maximum rated power of the engine 114). The engine speed may be increased and/or decreased based on the load. The engine 114 is operatively coupled with a muffler 146, which may be configured to output exhaust from the engine 114 via an exhaust pipe 132.

The fuel tank 116 may be located within the enclosure 104 or external to the enclosure 104. For example, the engine 114 may draw fuel from a fuel tank 116 that is external to the enclosure 104 via fuel line 138, such as a fuel tank 116 of the vehicle 158 (e.g., a work truck) to which the power system 100 is mounted (e.g., via mount brackets 140). The engine 114 is mechanically coupled or linked to a generator shaft of the generator 118. For example, the engine 114 is configured to output a rotational force to the generator 118 either directly or via a driveshaft 160.

The generator 118 generates output power based on the mechanical input from the engine 114. Specifically, the generator 118 is configured to generate electric power using the rotational force from the engine 114. In some examples, the generator 118 can be rigidly connected to the engine 114. The generator 118 supplies the electrical power to the power conversion circuitry 120. In some examples, the generator 118 is implemented using a high-output alternator. Collectively, the engine 114 and the generator 118 provide mechanical power and/or electrical power to power subsystems.

The power conversion circuitry 120 provides one or more types of electrical power suitable for specific and/or general purpose uses. The example power conversion circuitry 120 may include one or more power subsystems, such as the welding-type power supply 148, an auxiliary power supply configured to output AC power (e.g., 120 VAC, 240 VAC, 50 Hz, 60 Hz, etc.) and/or DC power (e.g., 12 VDC, 24 VDC, battery charging power, etc.) to the power outlets 150, and/or a vehicle power subsystem configured to convert electrical power to at least one of AC power or DC power to power or charge at least one component of a vehicle (e.g., battery charger 152), such as the vehicle 158 on which the power system 100 is mounted. The welding-type power supply 148 converts output power from the generator 118 to welding-type power based on a commanded welding-type output. The welding-type power supply 148 provides current at a desired voltage (e.g., from a user interface) to an electrode and a workpiece to perform a welding-type operation.

The power conversion circuitry 120 may include, for example, a switched mode power supply or an inverter fed from an intermediate voltage bus. Power conditioning circuitry may include a direct connection from a power circuit to the output (such as to the weld studs), and/or an indirect connection through power processing circuitry such as filters, converters, transformers, rectifiers, etc. For example, the power conversion circuitry 120 may convert, invert, or otherwise process power from the generator 118 to output an operating power to the air compressor 122 (e.g., where an electric air compressor is used), a welding power to the welding-type power supply 148, 110 VAC and/or 220 VAC power to a power outlet 150, a battery charging power to a battery charger 152 (e.g., via battery clamps), and/or any other type of electrical power. In other examples, such as the configuration illustrated in FIG. 2*a*, the air compressor 122 may be driven by the engine 114 via one more belts and/or pulleys. In this example, the air compressor 122 may be a rotary screw air compressor. For example, the generator 118 may include a clutch for transmission of rotational force from the engine 114 to the air compressor 122 via the one more belts and/or pulleys.

While illustrated as separate blocks, the power conversion circuitry 120 may be integrated, or otherwise share circuitry, with other components, such as the welding-type power supply 148. For example, the power conversion circuitry 120 may be configured to provide a welding current directly to a welding torch without requiring additional circuitry or power processing.

The control circuitry 166 employs a processor 154 is operatively coupled with a memory device 162 (e.g., read-only memory (ROM), random access memory (RAM), etc.) configured to monitor and/or control the various functions and statuses of the power system 100. For example, one or more operations of the power system 100 may be controlled by the processor 154 in accordance with instructions (e.g., software algorithms) stored to a memory device 162 and/or based on an operational status of the of the power system 100.

The one or more fan assemblies 134 are configured to urge cooling air through the enclosure 104 to cool one or more components of the power unit 102. The one or more fan assemblies 134 may be controlled by the processor 154. In one example, the fan assembly 134 comprises an electric fan with a variable speed motor. Alternatively, the fan assembly 134 may be a mechanical fan that is driven by the engine 114.

While the fan assembly 134 is the primary driver of the air through the enclosure, in some examples, other components of the power system 100 may employ dedicated fans. For example, the generator 118 may include a small generator fan to specifically cool the generator windings. Like the fan assembly 134, the generator fan moves air to an air outlet location. The generator fan can be significantly smaller than the fan assembly 134 and is not the primary driver of the air flow, because the generator fan is sized to cool only the generator 118.

The one or more sensors 156 (e.g., temperature sensor, humidity sensor, voltage sensors, current sensors etc.) may be located throughout the power unit 102 and configured to monitor one or more conditions of the power unit 102 or environment surrounding the power unit 102. For example, the processor 154 may be configured to monitor, via one or more sensors 156, a temperature of the engine 114, generator 118, power conversion circuitry 120, etc. The power system 100 may then control the power unit 102 based on the temperature of the environment or of the power unit 102 (or other feedback). Where the fan assembly 134 uses a variable speed motor, for example, the variable speed motor may be driven based on a measured temperature. When the temperature is low (whether due to environmental temperature or usage load), the fan assembly 134 may be operated at a lower speed to conserve power and to reduce acoustic noise; however, the fan assembly 134 may be operated at one or more higher speeds when the temperature is higher. For example, the measured temperature may be a temperature of a component within the enclosure 104 measure by the one or more sensors 156, such as the engine 114, the generator 118, the power conversion circuitry 120, the air compressor 122, the hydraulic pump 164, and/or the welding-type power supply 148. If a measured temperature deviates from an operating range, the processor 154 may disable the power unit 102 for a period of time (e.g., a cool down period).

The engine 114 in an engine-driven generator, such as the power system 100, may be operated at one or more desired speeds. In the case of a small diesel engine, the engine 114 may be operated at a speed between 1,800 and 3,600 revolutions per minute (RPM), where a high speed operation is generally about 3,600 RPM and a low speed operation is generally about 1,800 RPM. In one example, the engine 114 may be operated at 3,600 RPM to achieve high power in a small and light product package. In one example, the generator 118 may be a 2-pole generator configured to operate at 3,600 RPM (for full power). In this example, the generator 118 can be directly connected to the flywheel side of the engine 114 because the engine 114 and the generator 118 are synchronous relative to one another (i.e., they each operate at the same speed, for example, 3,600 RPM). A high speed operation (e.g., 3,600 RPM), however, results in increased noise and vibration compared a low speed operation. Driving the generator 118 configured for 3,600 RPM at a low speed operation (e.g., 1,800 RPM) would not provide adequate power.

To reduce operation noise from the engine 114 for a given package size, the engine 114 may be operated at medium speed operation that is between the high and low speed operation. A medium speed operation may be, for example between 1,800 RPM and 3,200 RPM, more preferable about 2,800 RPM. During the reduced medium speed operation, however, the engine 114 and the generator 118 are now non-synchronous to one another because the medium speed operation does not match the speed of the generator 118, which may be 3,600 RPM. As a result, the generator 118 cannot be directly connected to the engine 114 as in the first example while still attaining electric power needs.

Figure 2A:
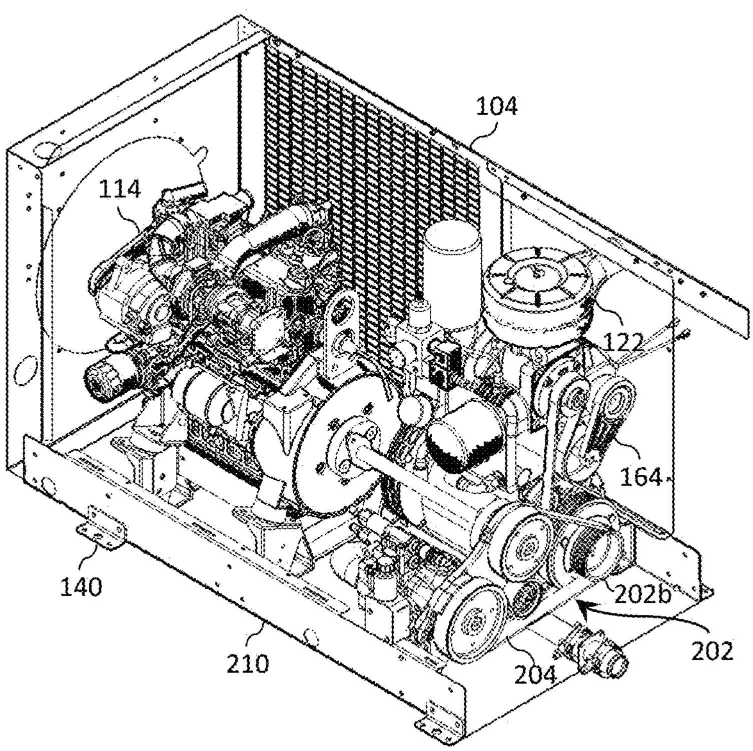
FIG. 2*a* illustrates a perspective view of the example power system showing its pulley system.
Figure 2B:
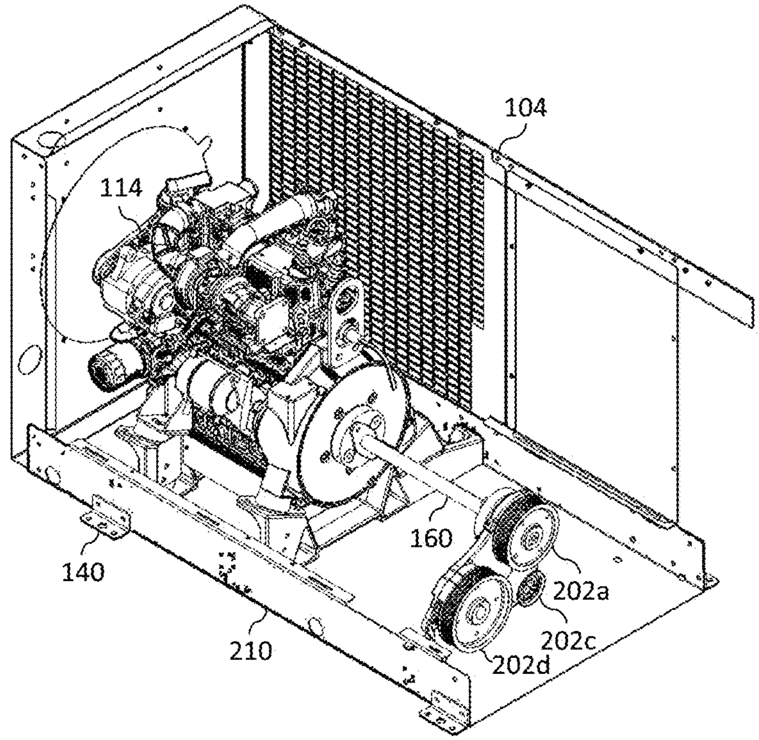
FIG. 2*b* illustrates the perspective view of FIG. 2*a* with the engine-driven components removed.
Figure 2C:
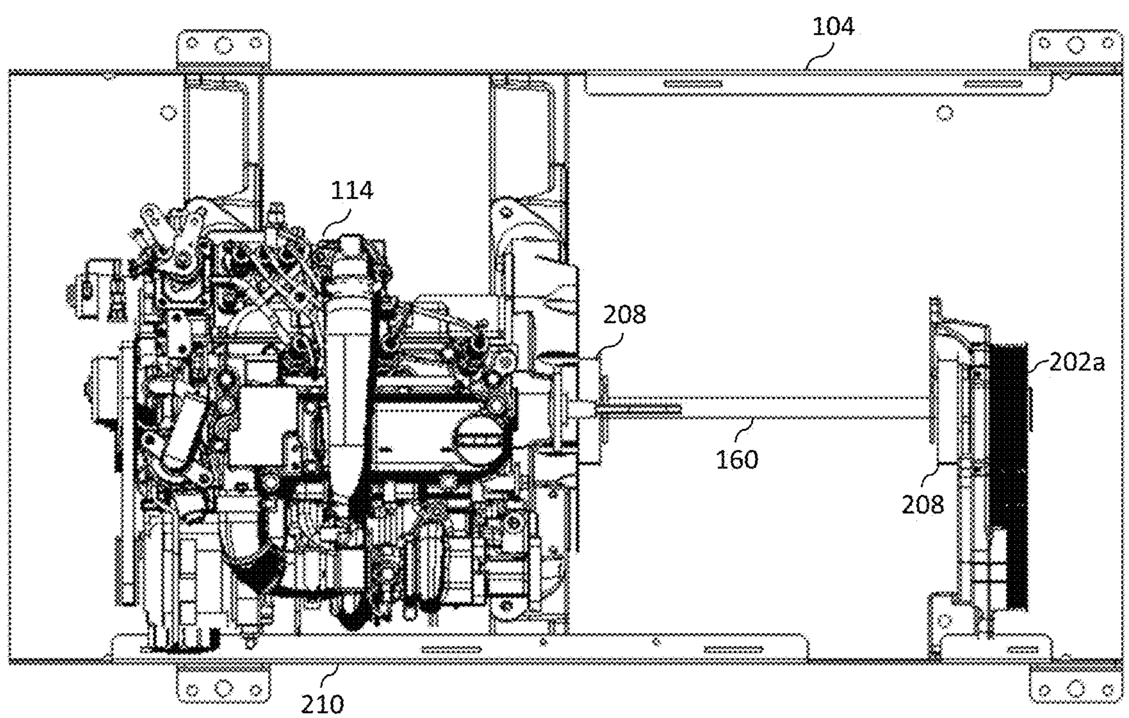
FIGS. 2*c* and 2*d* illustrate, respectively, a top plan and cross-sectional side views of the power system with the engine-driven components removed
Figure 2D:
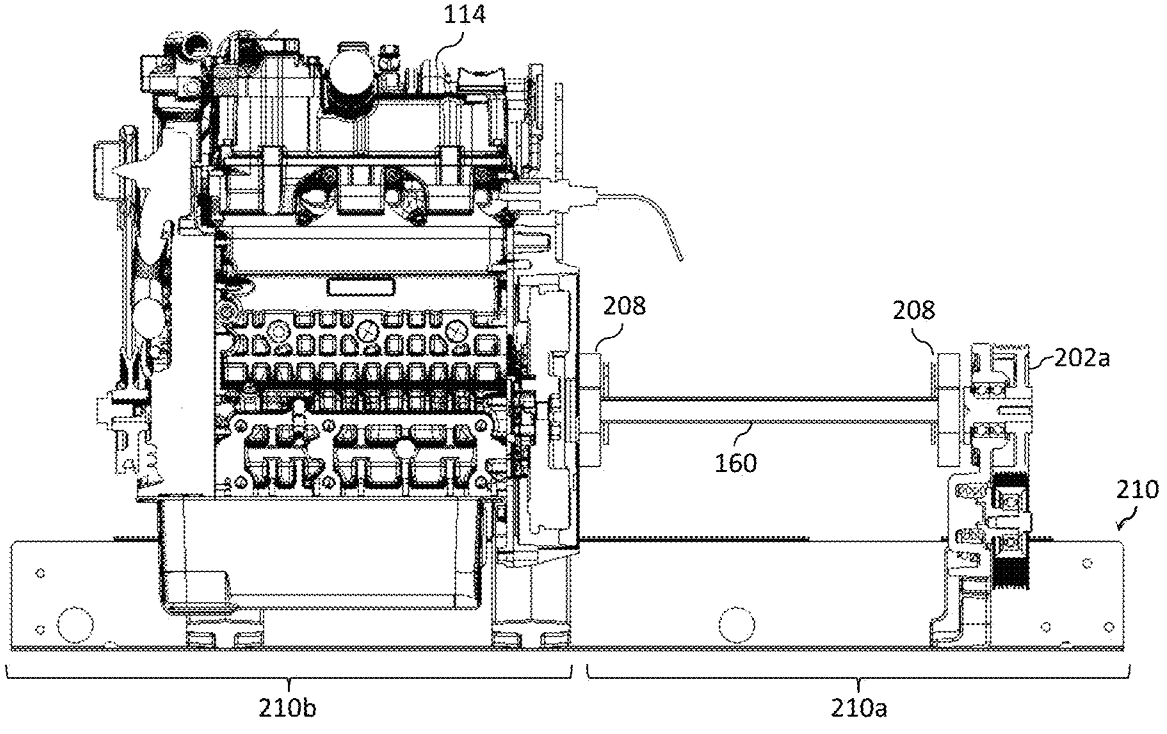
Figures 2E, 2F:
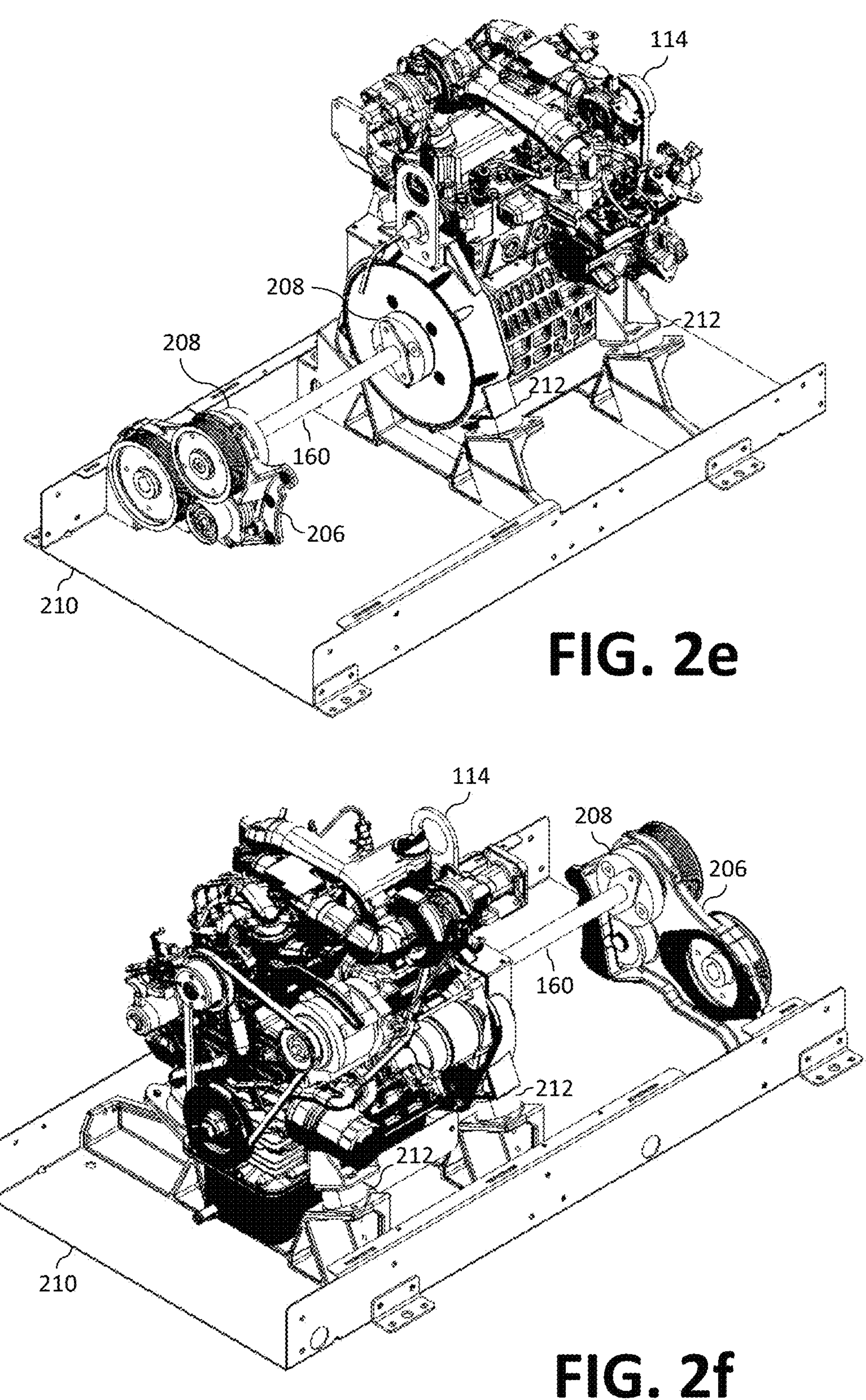
FIGS. 2*e* and 2*f* illustrate, respectively, front and rear perspective views of the power system with the engine-driven components removed.

To address the non-synchronous arrangement, the generator 118 may be coupled to the engine 114 via a driveshaft 160 and pulley system 202. The drive components of the power system 100, such as the driveshaft 160 and pulley system 202, will be better understood with reference to FIGS. 2*a* through 2*f*, which illustrate various views of the power system 100. Specifically, FIGS. 2*a* and 2*b* illustrate perspective views of the example power system 100 showing its pulley system 202, where the engine-driven components are removed from FIG. 2*b* for illustrative purposes, such as the generator 118, air compressor 122, and hydraulic pump 164. FIG. 2*c* through 2*f* illustrate, respectively top plan, cross-sectional side, front perspective, and rear perspective views of the power system 100 with the engine-driven components removed.

The driveshaft 160 combined with a pulley system 202 having a drive belt 204 allows the engine 114 to operate the generator 118 at full power and at a non-synchronous speed. For example, the engine 114 can operate at 2,800 RPM when the generator 118 is at 3,600 RPM via a pulley ratio on the pulley system 202. The driveshaft 160 and pulley system 202 may employ one or more vibration-dampening materials to further reduce operational noise. The vibration-dampening materials may be provided in the form of, for example, couplers and/or drive belts.

Using a driveshaft 160 with couplers that are configured to dampen vibration transferred by the driveshaft 160 to drive the pulley system 202 isolates the drive belt 204 from torsional vibrations. Such isolation also increases the longevity of drive belt 204 and allows all of the pulleys 202*a*, 202*b*, 202*c*, 202*d* of the pulley system 202 to be fixed relative to each other.

Vibrations from the engine 114 may be dampened by a driveshaft 160 that is configured to transfer torque from the engine 114, while also isolating the torsional vibrations of the engine 114. This arrangement allows the engine 114 to be isolated without adding major mass to it. Isolating the engine 114 limits overall sound output by mitigating noise-inducing vibration that transfer from the engine 114 to other components of the power unit 102 (e.g., generators 118, air compressors 122, exhaust systems, etc.). The drive belt 204 may also be fabricated from a vibration-dampening materials to dampen transfer of vibrations (and noise) through the pulley system 202.

The pulleys 202*a*, 202*b*, 202*c*, 202*d* of the pulley system 202 may be fixed relative to each other via a bracket 206, which provides structure for the pulleys 202*a*, 202*b*, 202*c*, 202*d*. In some examples, a tensioner is included to providing flexibility for the drive belt 204. Fixing the pulleys 202*a*, 202*b*, 202*c*, 202*d* relative to each other to reduces relative motion also reduces drive belt 204 wear and/or derailment (e.g., jumping off a pulley).

The driveshaft 160 may include a plurality of couplers 208 configured to dampen vibration transferred by the driveshaft 160. The one or more couplers 208 dampen vibration transferred by the driveshaft 160 to, inter alia, reduce operational noise and mitigate damage to driven components. In one example, the driveshaft 160 may include a plurality of couplers 208, where a first coupler 208 is configured to couple the driveshaft to the engine 114 and a second coupler 208 configured to couple the driveshaft 160 to the pulley system 202. The coupler 208 may include one or more dampening materials to dampen vibration transferred by the driveshaft 160. The one or more dampening materials serve to avoid metal-to-metal contact between the driveshaft 160 and the engine 114 and/or driven components (e.g., the pulley system 202).

The engine 114 is configured to output a rotational force to the pulley system 202 via the driveshaft 160. The rotational force may be at a first rotational speed. The pulley system 202 comprises a plurality of pulleys that are drivingly coupled to one another via one or more belts 204 at a fixed pulley ratio. The plurality of pulleys may include a first pulley 202*a* and a second pulley 202*b*. The fixed pulley ratio may be achieved by using pulleys of different sizes. For example, a first pulley 202*a* may be selected that has a diameter that is greater than the diameter of the second pulley 202*b* to achieved a desired fixed pulley ratio. The driveshaft 160 may be coupled to the first pulley 202*a* and configured to drive the first pulley 202*a* at the first rotational speed. In one example, the fixed pulley ratio can be between 1:1.25 and 1:1.3. In one example, the second rotational speed is about 3,600 RPM and the first rotational speed is between 1,800 RPM and 3,200 RPM, more preferably about 2,800 RPM. The fixed pulley ratio can be adjusted to achieve a desire RPM at the second pulley 202*b* based on the speed received at the first pulley 202*a*. In an example, the fixed pulley ratio can be between 1:1.25 and 1:1.3.

The first pulley 202*a* is configured to drive the second pulley 202*b* at a second rotational speed that is greater than the first rotational speed. For example, the second rotational speed may be between 3,200 RPM and 3,600 RPM. The generator 118 configured to generate electric power, wherein the generator 118 is coupled to the second pulley 202*b* and configured to receive the rotational force at the second rotational speed. The second pulley 202*b* may be coupled to the generator 118 and configured to drive the generator 118 (e.g., via its generator clutch). For example, the second pulley 202*b* may have an integrated clutch to drive the generator shaft.

The first pulley 202*a* and the second pulley 202*b* are drivingly coupled to one another via one or more belts 204 and/or one or more intermediate pulleys 202*c*, 202*d* (e.g., tensioners, idlers, etc.). For example, the power system 100 may also include an idler pulley and a tensioner, wherein the drive belt 204 links the generator clutch (e.g., via second pulley 202*b*), the air compressor pulley, the idler pulley, and the tensioner. In some examples, the engine 114 is configured to drive the drive belt 204, such that the idler pulley and the tensioner are driven in a first rotational direction and the second pulley 202*b* is driven in a second rotational direction opposite the first rotational direction. In examples, the drive belt 204 is driven in a tortuous path around the generator clutch, the air compressor 122 pulley, the idler pulley, and the tensioner.

The welding-type power supply 148 is configured to receive electric power from the generator 118, while the air compressor 122 and the hydraulic pump 164 may be driven by the pulley system 202 via one or more belts. In certain aspects, the air compressor 122 and the hydraulic pump 164 may be electric, in which case they may be powered by electricity from the generator 118 (e.g., via power conversion circuitry 120).

The engine 114 and other component s of the power unit 102 can be mounted to a base structure 210, which may be configured as one or more components. The base structure 210 be a portion of, or otherwise integrated with, the enclosure 104, such has the bottom side.

The engine 114 and generator 118 can be vibration isolated from the base structure 210 of the enclosure 104. For example, the engine 114 and/or the generator 118 may be mounted to the base structure 210 via one or more isolator mounts 212 to dampen vibration transfer from the engine 114 to the base structure 210. Other components (e.g., the power conversion circuitry 120, the air compressor 122, etc.) can be similarly mounted to the base structure 210 via isolator mounts 212 within the enclosure 104 to provide stability, service access, and allow air to flow underneath the components. In some power systems, the air compressor 122 may be located next to and/or below the engine 114 to enable connection between the air compressor 122 shaft and the engine shaft of the engine 114 via a drive belt 204. In the illustrated power system 100, the air compressor 122 is positioned above the generator 118, which reduces the difficulty of servicing the air compressor 122, relative to conventional power systems, because the higher location in the enclosure positions the service points closer to top cover openings and/or side door openings that are generally easier to access for maintenance personnel.

The generator 118, air compressors 122, hydraulic pump 164, and welding-type power supply 148 are all rigidly mounted to the base structure 210 of the power system 100, which adds mass to the structure of the power system 100 and keep the vibrating engine 114 mass low. This produces a low ratio of isolated mass to fixed mass, which allows the engine 114 isolation system to have low transmissibility and thus prevents vibration from moving from the engine 114 to the rest of the power system 100.

While illustrated as a single base structure 210, the base structure 210 may instead be provided as two separate components that are vibrationally isolated from one another. For example, the base structure 210 may comprises a first base structure 210*a* that is arranged to dampen vibration transfer to a second base structure 210*b*. In this example, the generator 118 can be mounted to the first base structure 210*a* and the engine 114 can be mounted to the second base structure 210*b*.

Figure 3A:
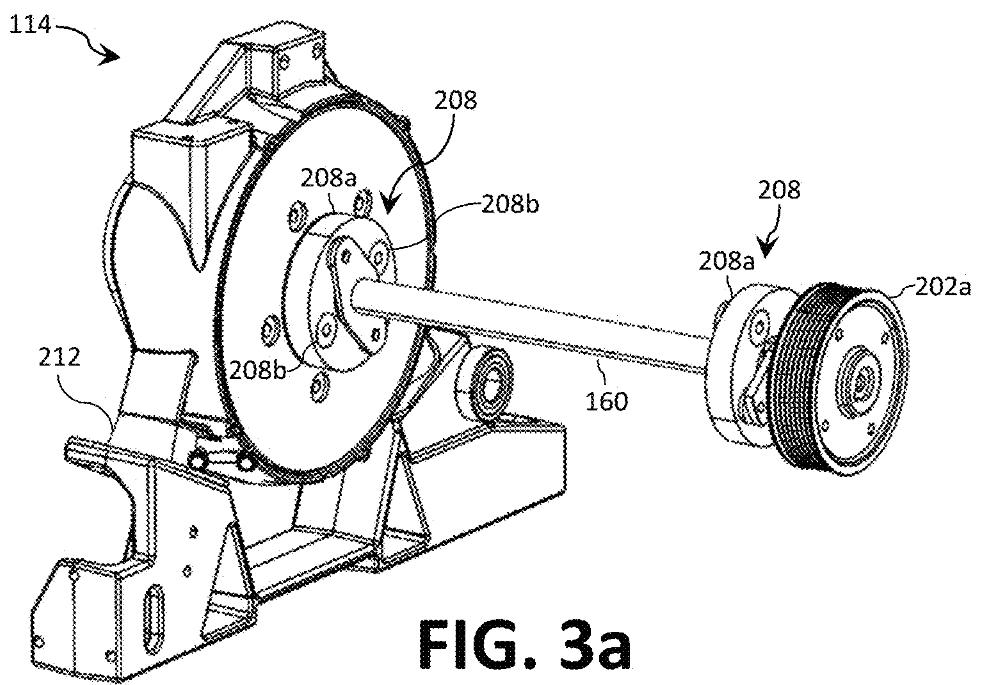
FIGS. 3*a* and 3*b* illustrate, respectively, front and rear perspective views of the driveline of the power system.
Figure 3B:
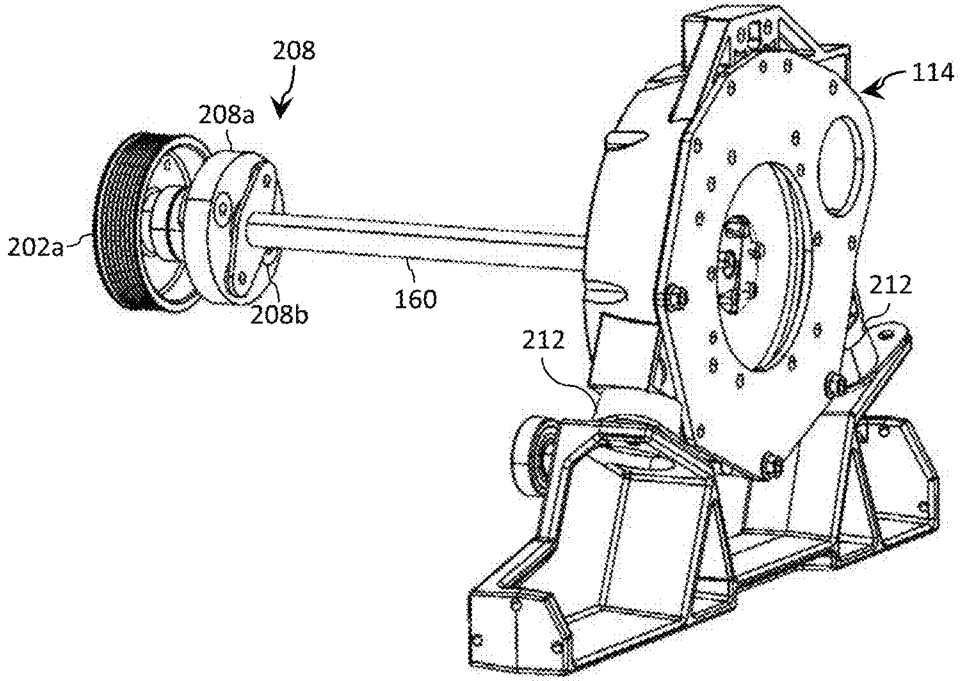

FIGS. 3*a* and 3*b* illustrate, respectively, front and rear perspective views of the driveline of the power system 100. As illustrated, each coupler 208 may be composed of a dampening component 208*a* and one or more metal inserts 208*b*. The dampening component 208*a* may be, for example, a highly flexible elastomeric ring, though other arrangements are contemplated. The dampening component 208*a* reduces the need for lubrication and maintenance of the power unit 100, while also providing vibration isolation, operational noise isolation, shock protection, and permitting angular misalignment. The dampening component 208*a* may be shaped to receive metal inserts 208*b*, which serve as attachments points for the driveshaft 160, engine 114, and first pulley 202*a*. The dampening component 208*a* may be fabricated from a viscoelastic materials or other vibration-dampening polymers. In one example, the coupler 208 may be a rubber coupler that comprises a dampening component 208*a* that is fabricated from rubber. In another example, the coupler 208 may comprises a dampening component 208*a* that is fabricated from a synthetic polymer. The metal inserts 208*b* reinforce the attachment point of the dampening component 208*a* and may be provided as a tubular insert. One or more fasteners mechanical fasteners 112 (e.g., a bolt) may pass through the metal inserts 208*b* to attached the driveshaft 160, engine 114, the first pulley 202*a*, or other component. The isolator mounts 212 may similarly employ a dampening component fabricated from a viscoelastic materials or other vibration-dampening polymers. The dampening component may be sandwiched between two or metal components, which may be threaded to receipt a nut or bolt.

Figure 4:
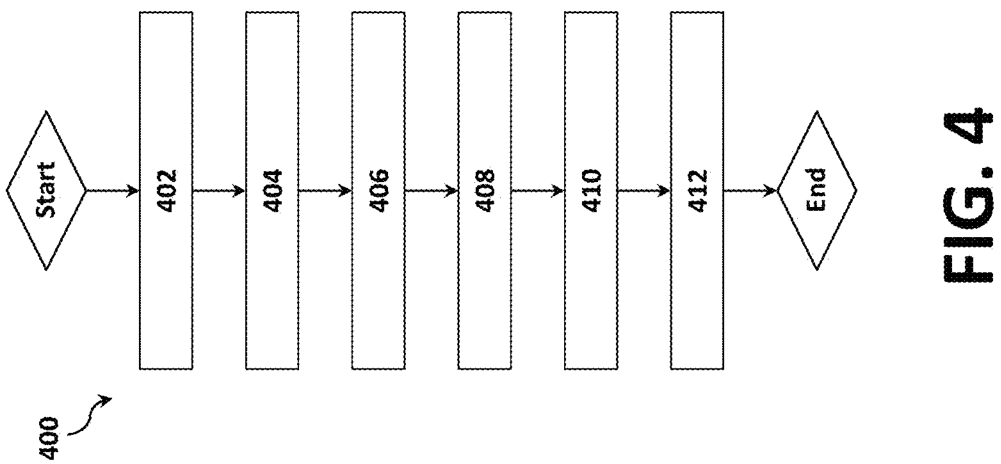
FIG. 4 is a flowchart representative of an example method for operating a power system.

FIG. 4 illustrates an example method 400 for operating a power system 100, such as the power system 100 described above in connection with FIGS. 1*a* through 3*b*.

At block 402, the engine 114 outputs a rotational force to a driveshaft 160. The driveshaft 160 may comprise at least one coupler 208 configured to dampen vibration transferred by the driveshaft 160. The engine 114 may be further mounted to a base structure 210 and arranged to dampen vibration transfer to other components in the power unit 102. For example, the engine 114 may be mounted to the base structure 210 via one or more isolator mounts 212.

At block 404, the pulley system 202 receives the rotational force. The pulley system 202 may receive the rotational force at a first pulley 202*a* (e.g., a driving pulley) of a pulley system 202.

At block 406, the rotational force is transferred from the first pulley 202*a* to a second pulley 202*b* (e.g., a driven pulley) of the pulley system 202. The rotational force can be transferred between the first pulley 202*a* and second pulley 202*b* via one or more belts 204. The first pulley 202*a* and the second pulley 202*b* that are drivingly coupled to one another at a fixed pulley ratio.

At block 408, the rotational force is received at a generator 118. The rotational force is received at a generator 118 via the second pulley 202*b*. The second pulley 202*b* may be coupled to the generator 118 and configured to drive the generator 118 (e.g., its generator clutch). The generator 118 may be further mounted to the base structure 210 or a different base structure that is arranged to dampen vibration transfer from the engine 114. For example, the generator 118 may be mounted to the base structure 210 via one or more isolator mounts 212.

At block 410, the generator 118 generates electric power. The electric power may be used to power a component of the power system 100 (e.g., one or more fan assemblies 134, a processor 154, a memory device 162, one or more sensors 156, etc.) and/or one or more accessories (e.g., a welding-type power supply 148, one or more power outlets 150, a battery charger 152, a hydraulic pump 164, etc.).

At block 412, the component of the power system 100 and/or one or more accessories receives the electric power from the generator 118.

Figure 5:
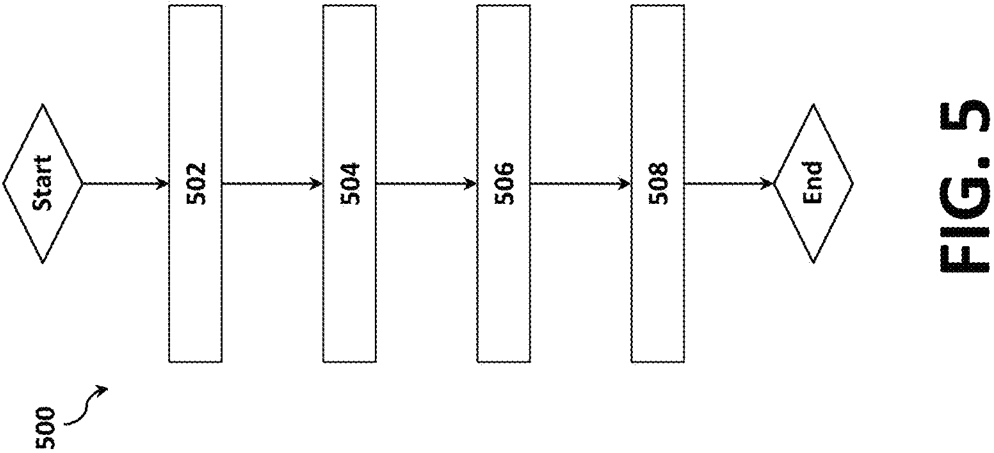
FIG. 5 is a flowchart representative of an example method for operating a power system non-synchronously.

FIG. 5 illustrates an example method 500 for operating a power system 100 non-synchronously, such as the power system 100 described above in connection with FIGS. 1*a* through 3*b*.

At block 502, the engine 114 outputs a rotational force to a driveshaft 160 at a first rotational speed.

At block 504, the pulley system 202 receives and converts the rotational force from the first rotational speed to a second rotational speed that is greater than the first rotational speed. The pulley system 202 comprises a plurality of pulleys that are drivingly coupled to one another via a plurality of pulleys at a fixed pulley ratio. The plurality of pulleys may include the first pulley 202*a* and the second pulley 202*b*. The fixed pulley ratio may be between 1:1.25 and 1:1.3.

At block 506, the generator 118 receives the rotational force at the second rotational speed.

At block 508, the generator 118 generates electric power. The electric power may be used to power a component of the power system 100 and/or one or more accessories.

While the present method and/or system has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, block and/or components of disclosed examples may be combined, divided, re-arranged, and/or otherwise modified. Therefore, the present method and/or system are not limited to the particular implementations disclosed. Instead, the present method and/or system will include all implementations falling within the scope of the appended claims, both literally and under the doctrine of equivalents.

What is claimed is:

1. A power system comprising:

a driveshaft;

an engine configured to output a rotational force and drivingly coupled to the driveshaft to drive the driveshaft;

a pulley system comprising a first pulley, a second pulley, and one or more belts;

a generator configured to generate electric power by receiving the rotational force; and an enclosure, wherein the driveshaft, the engine, and the generator are arranged within the enclosure, wherein:

the driveshaft is drivingly coupled to the first pulley to drive the first pulley;

the first pulley is drivingly coupled to the second pulley via the one or more belts to drive the second pulley;

the generator is drivingly coupled to the second pulley at a first generator side of the generator to drive the generator; and the generator extends from the first generator side and toward the engine to a second generator side of the generator opposite the first generator side.

2. The power system of claim 1, wherein:

the driveshaft is drivingly coupled to the first pulley at a first driveshaft end of the driveshaft; and the driveshaft is drivingly coupled to the engine at a second driveshaft end of the driveshaft opposite the first driveshaft end.

3. The power system of claim 2, wherein the driveshaft extends beyond the second generator side of the generator to the second driveshaft end of the driveshaft.

4. The power system of claim 2, wherein:

the first pulley comprises a first pulley side facing toward the engine and a second pulley side opposite the first pulley side; and the second driveshaft end is positioned between the engine and the first pulley side of the first pulley.

5. The power system of claim 2, wherein:

the pulley system comprises a first pulley system side facing toward the engine and a second pulley system side opposite the first pulley system side; and the second driveshaft end and the second generator side are positioned between the first pulley system side and the engine.

6. The power system of claim 1, wherein:

the engine outputs the rotational force at an engine output side of the engine; and the generator is arranged between the pulley system and the engine output side of the engine.

7. The power system of claim 6, wherein the second generator side faces the engine output side.

8. The power system of claim 1, wherein the generator is positioned within the enclosure between the driveshaft, the pulley system, the engine, and a side of the enclosure.

9. The power system of claim 1, further comprising one or more couplers coupled to the driveshaft and configured to dampen vibration transferred by the driveshaft, wherein at least one of the one or more couplers drivingly couples the driveshaft to the engine or to the first pulley.

10. The power system of claim 9, wherein:

the driveshaft is drivingly coupled to the first pulley at a first driveshaft end of the driveshaft; and the driveshaft is drivingly coupled to the engine via at least one first coupler of the one or more couplers at a second driveshaft end of the driveshaft opposite the first driveshaft end.

11. The power system of claim 10, wherein the driveshaft is drivingly coupled to the first pulley via at least one second coupler of the one or more couplers at the first driveshaft end of the driveshaft.

12. The power system of claim 9, wherein:

the driveshaft is drivingly coupled to the first pulley via at least one coupler of the one or more couplers at a first driveshaft end of the driveshaft; and the driveshaft is drivingly coupled to the engine at a second driveshaft end of the driveshaft opposite the first driveshaft end.

13. The power system of claim 9, wherein:

at least one coupler of the one or more couplers comprises at least one metal insert and a dampening component shaped to receive the at least one metal insert; and the at least one metal insert is an attachment point between the at least one coupler and the driveshaft.

14. The power system of claim 9, wherein the one or more couplers comprise at least one dampening material configured to avoid at least one of contact between the engine and the driveshaft or contact between the driveshaft and the first pulley.

15. The power system of claim 14, wherein the at least one dampening material is configured to avoid contact between the engine and the driveshaft.

16. The power system of claim 14, wherein the at least one dampening material is configured to avoid contact between the driveshaft and the first pulley.

17. The power system of claim 14, wherein the at least one dampening material is configured to avoid contact between the engine and the drive shaft and to avoid contact between the driveshaft and the first pulley.

18. The power system of claim 1, wherein a first diameter of the first pulley and a second diameter of the second pulley define a pulley ratio greater than or equal to 1:1.25 and less than or equal to 1:1.3.

19. The power system of claim 1, wherein:

the pulley system further comprises an intermediate pulley;

the first pulley is drivingly coupled to the intermediate pulley via at least one of the one or more belts to drive the intermediate pulley; and the second pulley is drivingly coupled to the intermediate pulley via at least one of the one or more belts to drive the second pulley.

20. A power system comprising:

a driveshaft;

an engine configured to output a rotational force and drivingly coupled to the driveshaft to drive the driveshaft;

a pulley system comprising a first pulley, a second pulley, and one or more belts; and a generator configured to generate electric power by receiving the rotational force, wherein the generator is mounted to a first base structure and the engine is mounted to a second base structure that is arranged to dampen vibration transfer to the first base structure wherein:

the driveshaft is drivingly coupled to the first pulley to drive the first pulley;

the first pulley is drivingly coupled to the second pulley via the one or more belts to drive the second pulley;

the generator is drivingly coupled to the second pulley at a first generator side of the generator to drive the generator; and the generator extends from the first generator side and toward the engine to a second generator side of the generator opposite the first generator side.

* * * * *